US012633608B2

(12) United States Patent (10) Patent No.: US 12,633,608 B2
Kondo et al. (45) Date of Patent: May 19, 2026

(54) VEHICLE BATTERY ROTATING STRUCTURE

(71) Applicant: HONDA MOTOR CO., LTD., Tokyo (JP)

(72) Inventors: Takehiro Kondo, Tokyo (JP); Hiroyuki Anzai, Tokyo (JP); Ryoji Tokuda, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1017 days.

(21) Appl. No.: 17/687,691

(22) Filed: Mar. 7, 2022

(65) Prior Publication Data

US 2022/0320660 A1 Oct. 6, 2022

(30) Foreign Application Priority Data

Mar. 31, 2021 (JP) ................................. 2021-059387

(51) Int. Cl.
*H01M 50/242* (2021.01)
*B60R 16/033* (2006.01)
*H01M 50/249* (2021.01)

(52) U.S. Cl.
CPC ......... *H01M 50/242* (2021.01); *B60R 16/033* (2013.01); *H01M 50/249* (2021.01); *H01M 2220/20* (2013.01)

(58) Field of Classification Search
CPC ............. H01M 50/242; H01M 50/244; H01M 50/249; H01M 50/262; H01M 50/238;
(Continued)

(56) References Cited

U.S. PATENT DOCUMENTS 6,431,300 B1 8/2002 Iwase
2009/0166116 A1* 7/2009 Kiya .................... H01M 50/209
180/68.5
(Continued)

FOREIGN PATENT DOCUMENTS

CN 103338954 A 10/2013
CN 107031542 A 8/2017
(Continued)

OTHER PUBLICATIONS

JP2017132354A translation (Year: 2017).*
(Continued)

*Primary Examiner* — Helen Oi K Conley
*Assistant Examiner* — Amanda Rosenbaum
(74) *Attorney, Agent, or Firm* — CKC & Partners Co., LLC

(57) ABSTRACT

A vehicle battery rotating structure is provided that allows a battery receptacle to be stably deformed at the time of a head-on collision to rotate a battery. A vehicle battery rotating structure 30 includes: a battery B that faces an engine-mounted part 12; a battery supporting face that is deformable into an inverted-V shape at the time of a head-on collision; a pair of battery locking pieces each of which is arranged on either side of the center in the front-rear direction of the battery supporting face; a pair of locking rods 41 that is locked in locking holes of the pair of battery locking pieces; and a pressure plate 42 that is connected to upper parts of the pair of locking rods 41.

13 Claims, 12 Drawing Sheets

(58) Field of Classification Search
CPC ............. H01M 50/20; B60K 2001/001; B60K
2001/005; B60K 2001/0411
See application file for complete search history.

(56) References Cited

U.S. PATENT DOCUMENTS

| | | | | |
|---|---|---|---|---|
| 2010/0170736 A1* | 7/2010 | Watanabe | ............ | B62D 21/152 |
| | | | | 180/68.5 |
| 2013/0307330 A1 | 11/2013 | Hotta et al. | | |
| 2018/0178641 A1* | 6/2018 | Yamafuji | .............. | H01M 8/247 |

FOREIGN PATENT DOCUMENTS

| | | | | | |
|---|---|---|---|---|---|
| EP | 2186686 | A1 | | 5/2010 | |
| JP | H0952534 | A | * | 2/1997 | |
| JP | 2013159227 | A | | 8/2013 | |
| JP | 2016168910 | A | | 9/2016 | |
| JP | 2017013556 | A | | 1/2017 | |
| JP | 2017030387 | A | | 2/2017 | |
| JP | 2017132354 | A | * | 8/2017 | ............. B60R 16/04 |
| JP | 2019014274 | A | | 1/2019 | |

OTHER PUBLICATIONS

JPH0952534A translation (Year: 1997).*
Office Action issued Mar. 31, 2025 in the CN Patent Application No. 202210305027.6.

* cited by examiner

VEHICLE BATTERY ROTATING STRUCTURE

This application is based on and claims the benefit of priority from Japanese Patent Application No. 2021-059387, filed on 31 Mar. 2021, the content of which is incorporated herein by reference.

BACKGROUND OF THE INVENTION

Field of the Invention

The present invention relates to a vehicle battery rotating structure.

Related Art

A conventionally known battery supporting structure includes a battery receptacle on which a battery mounted on a vehicle is placed, and a supporting member that supports the battery receptacle (e.g., see Patent Document 1).

Patent Document 1: Japanese Unexamined Patent Application, Publication No. 2019-14274

SUMMARY OF THE INVENTION

With a battery supporting structure in the above configuration, it is impossible to rotate a battery in order to protect occupants' ankles and the like at the time of a head-on collision of the vehicle because of the rigidity of the supporting member. The present invention aims to provide a vehicle battery rotating structure that allows a battery receptacle to be stably deformed at the time of a head-on collision to rotate a battery.

(1) A battery mounting part supporting structure (e.g., a vehicle battery rotating structure 30 described later) according to an embodiment of the present invention includes: a battery (e.g., a battery B described later) that faces an engine-mounted part (e.g., a brake master cylinder device 12 described later); a battery supporting face (e.g., battery supporting faces 3110, 3120, and 3130 described later) that is deformable into an inverted-V shape at the time of a head-on collision; a pair of battery locking pieces (e.g., battery locking pieces 3111 and 3121 described later) each of which is arranged on either side of a center in the front-rear direction of the battery supporting face; a pair of locking rods (e.g., locking rods 41 and 43 described later) that is locked in locking holes (e.g., locking holes 3112 and 3122 described later) of the pair of battery locking pieces; and a pressure plate (e.g., a pressure plate 42 described later) that is connected to upper parts of the pair of locking rods.

(2) In the battery mounting part supporting structure according to (1), a groove (e.g., grooves 3114 and 3124 described later) may be formed in a rear part of the battery supporting face that supports the battery.

(3) In the battery mounting part supporting structure according to (2), an upper battery supporting bracket (e.g., an upper battery supporting bracket 37 described later) may be provided behind the groove and may have a bent portion (e.g., a bent portion 376 described later) that is fixed to a rigid member (e.g., a rigid member 15 described later) on a side part of a vehicle body. The groove and the bent portion may be disposed between the engine-mounted part and a mounting base (e.g., a mounting base 50 described later) that supports the battery supporting face.

4) In the battery mounting part supporting structure according to (1), the battery supporting face may have an opening (e.g., an opening 3101 described later).

(5) In the battery mounting part supporting structure according to (1), the battery supporting face may be divided into one battery supporting face (e.g., an upper face of a left-side supporting plate 311A described later) and an other battery supporting face (e.g., an upper face of a right-side supporting plate 312A described later).

(6) In the battery mounting part supporting structure according to (3), the upper battery supporting bracket may have: an abutting face (e.g., an abutting face 372 described later) that is formed to have an approximate L-shaped cross section and faces the engine-mounted part; and a rear battery supporting face (e.g., a rear battery supporting face 371 described later).

(7) In the battery mounting part supporting structure according to (2), the groove may have a plurality of notches (e.g., notches 3115 and 3116 described later) formed thereon.

(8) In the battery mounting part supporting structure according to (3), a rear supporting leg (e.g., a rear supporting leg 36 described later) coupled to a front side frame (e.g., a front side frame 11 described later) may be coupled to the upper battery supporting bracket.

(9) In the battery mounting part supporting structure according to (2), the groove may be formed to have an approximate L-shaped cross section by an inclined portion (e.g., inclined portions 3117 and 3127 described later) and a vertical wall portion (e.g., vertical wall portions 3118 and 3128 described later).

(10) In the battery mounting part supporting structure according to (8), the groove may be formed to have an approximate L shaped cross section by the inclined portion and vertical wall portion, and the vertical wall portion may be coupled to a front face of the rear supporting leg.

(11) In the battery mounting part supporting structure according to (5), a reinforcement bracket (e.g., a reinforcement bracket 35 described later) that reinforces the one battery supporting face may be coupled to a mounting base that supports the battery supporting face.

(12) In the battery mounting part supporting structure according to (5), the one battery supporting face and the other battery supporting face may be coupled to a front supporting leg in front (e.g., a front supporting leg 60A described later) so as to be vertically asymmetrical to each other.

(13) In the battery mounting part supporting structure according to (12), the front supporting leg may be inclined toward the other battery supporting face.

The present invention can provide a vehicle battery rotating structure that allows a battery receptacle to be stably deformed at the time of a head-on collision to rotate a battery.

DETAILED DESCRIPTION OF THE INVENTION

Figure 1:
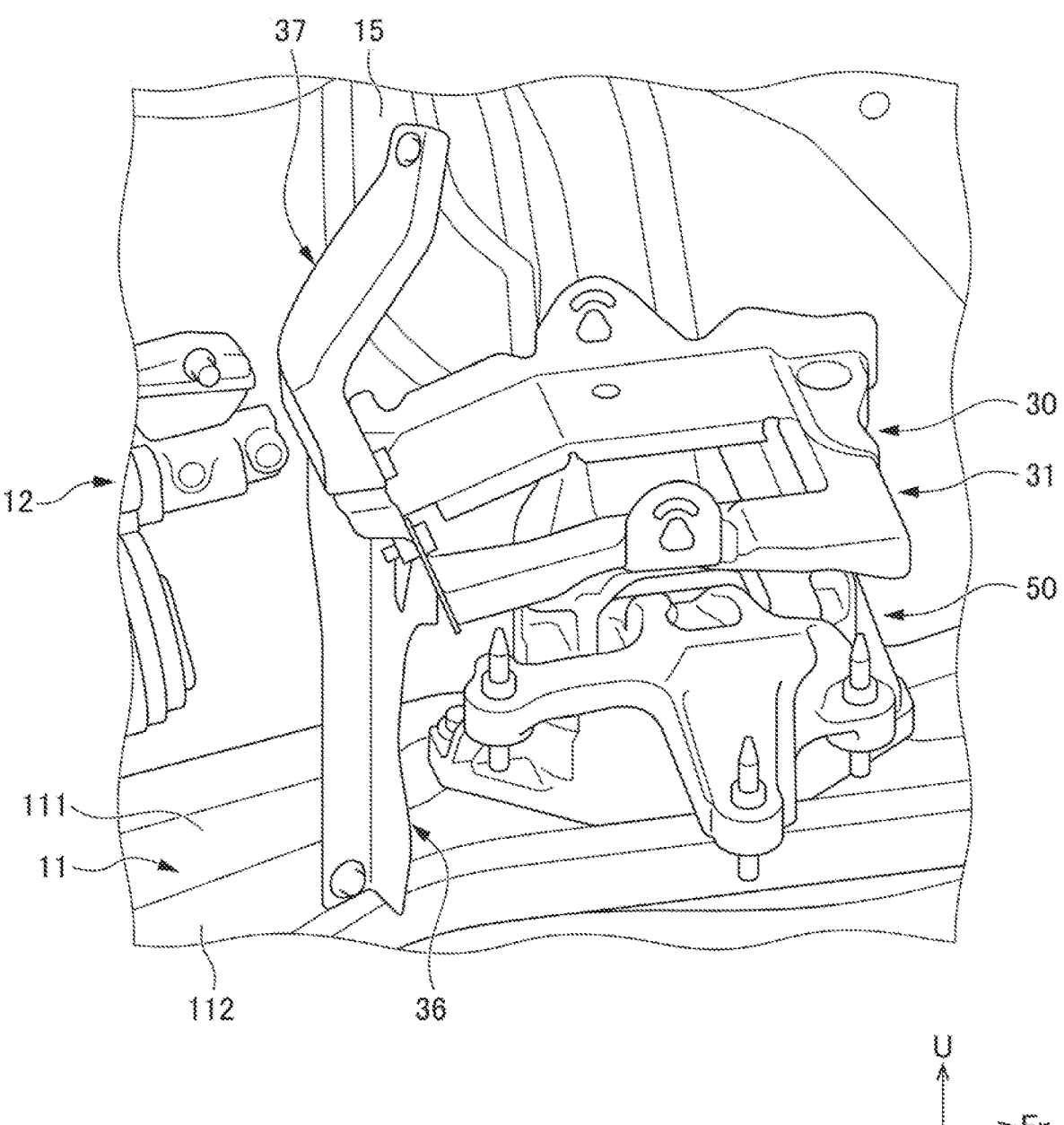
FIG. 1 is an enlarged perspective view that illustrates a periphery of a front side frame in which a vehicle battery rotating structure according to a first embodiment of the present invention is disposed, as viewed from behind and above.
Figure 2:
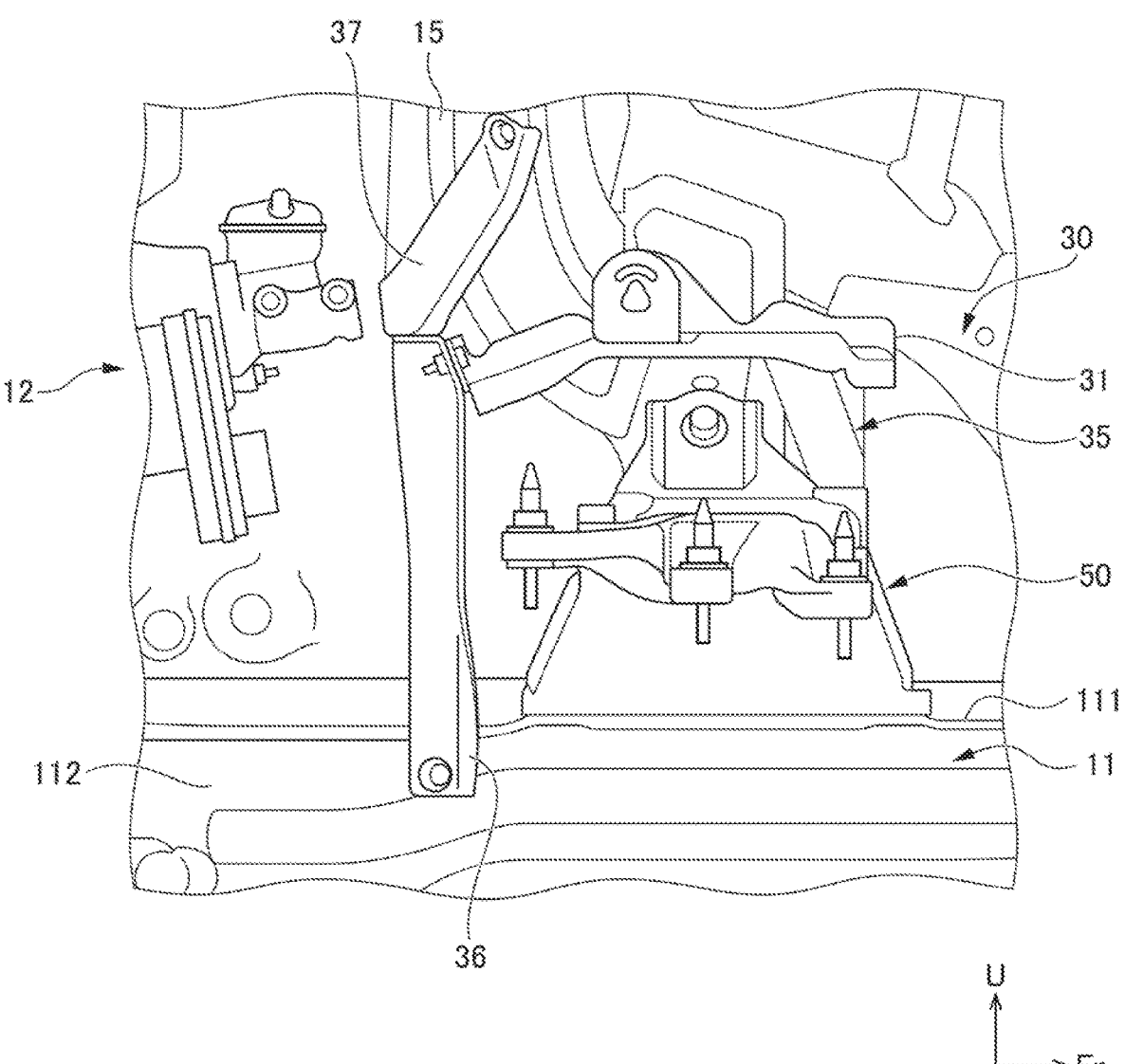
FIG. 2 is an enlarged side view that illustrates the periphery of the front side frame in which the vehicle battery rotating structure according to the first embodiment of the present invention is disposed, as viewed from a right side of a vehicle body.
Figure 3:
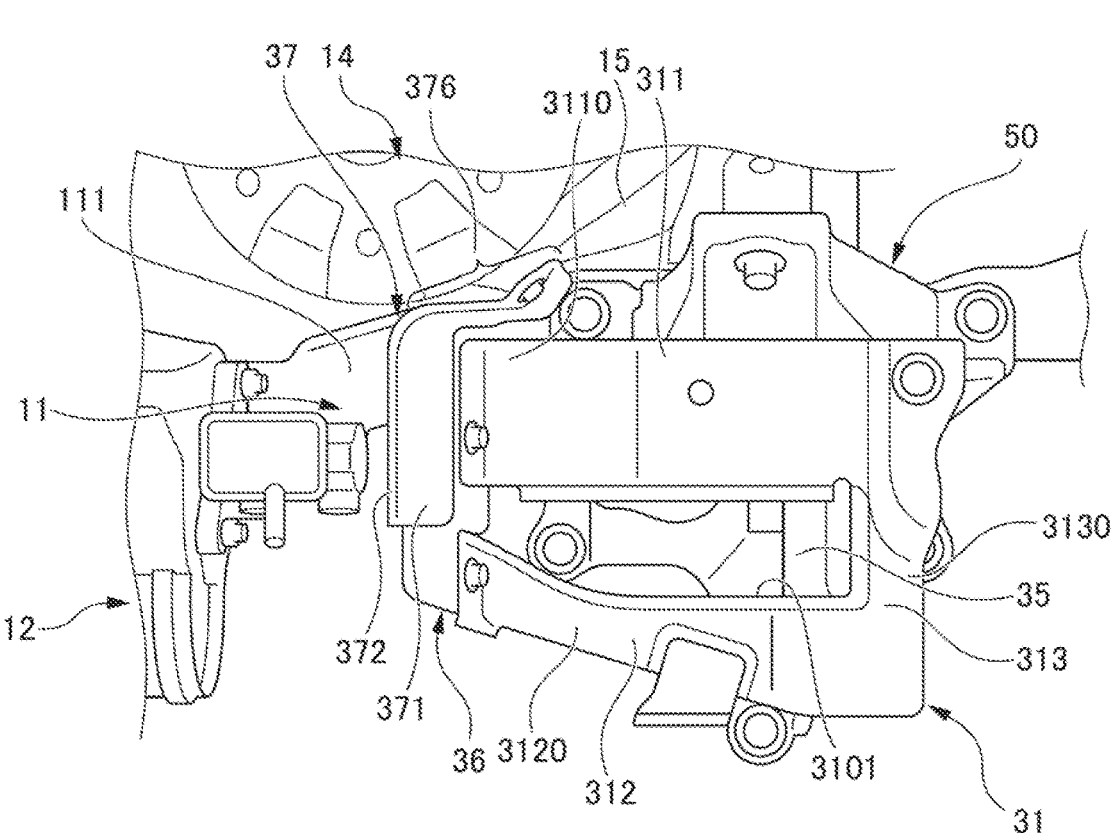
FIG. 3 is an enlarged plan view that illustrates the periphery of the front side frame in which the vehicle battery rotating structure according to the first embodiment of the present invention is disposed.
Figure 3:
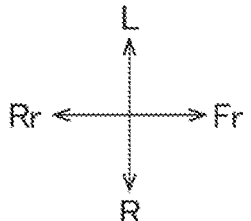
Figure 4:
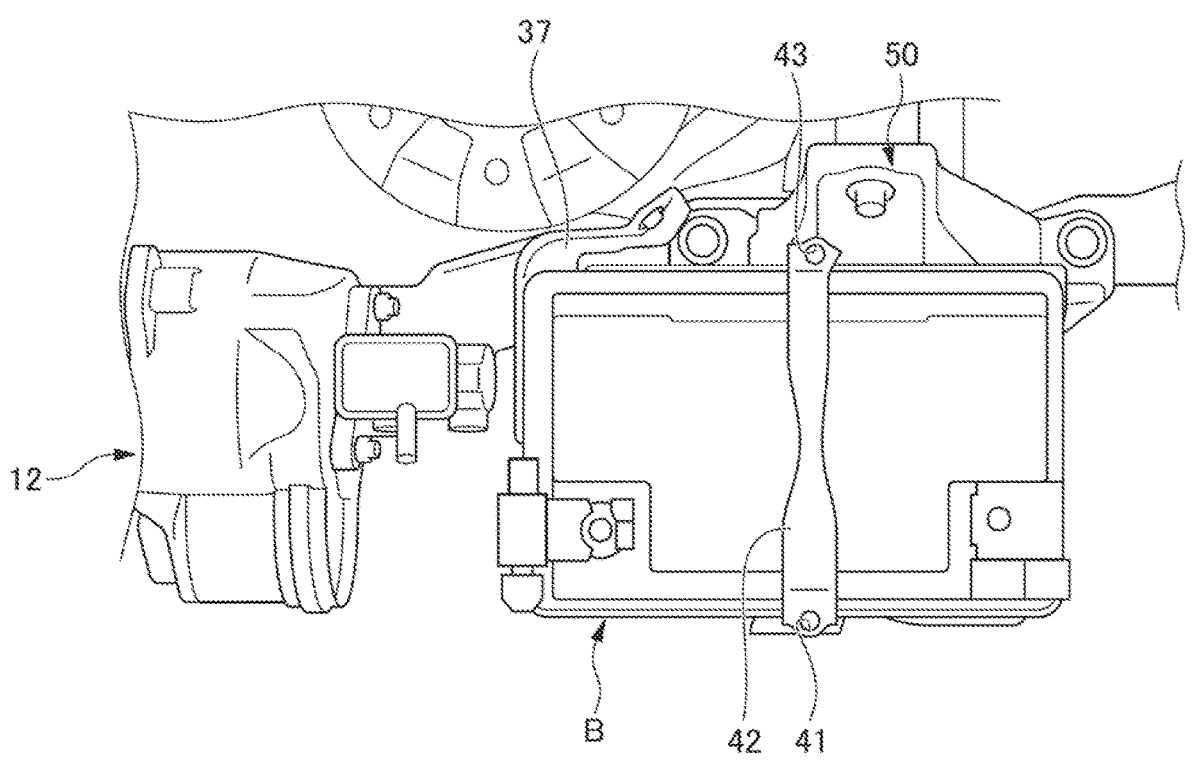
FIG. 4 is an enlarged plan view that illustrates a state where a battery is supported by the vehicle battery rotating structure according to the first embodiment of the present invention.
Figure 4:
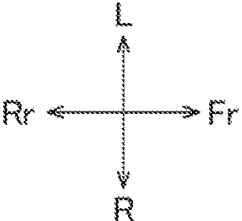

Embodiments of the present invention will be described in detail with reference to drawings. FIG. 1 is an enlarged perspective view that illustrates a periphery of a front side frame 11 in which a vehicle battery rotating structure 30 is disposed, as viewed from behind and above. FIG. 2 is an enlarged side view that illustrates the periphery of the front side frame 11 in which the vehicle battery rotating structure 30 is disposed, as viewed from a right side of a vehicle body. FIG. 3 is an enlarged plan view that illustrates the periphery of the front side frame 11 in which the vehicle battery rotating structure 30 is disposed. FIG. 4 is an enlarged plan view that illustrates a state in which a battery B is supported by the vehicle battery rotating structure 30.

Figure 5:
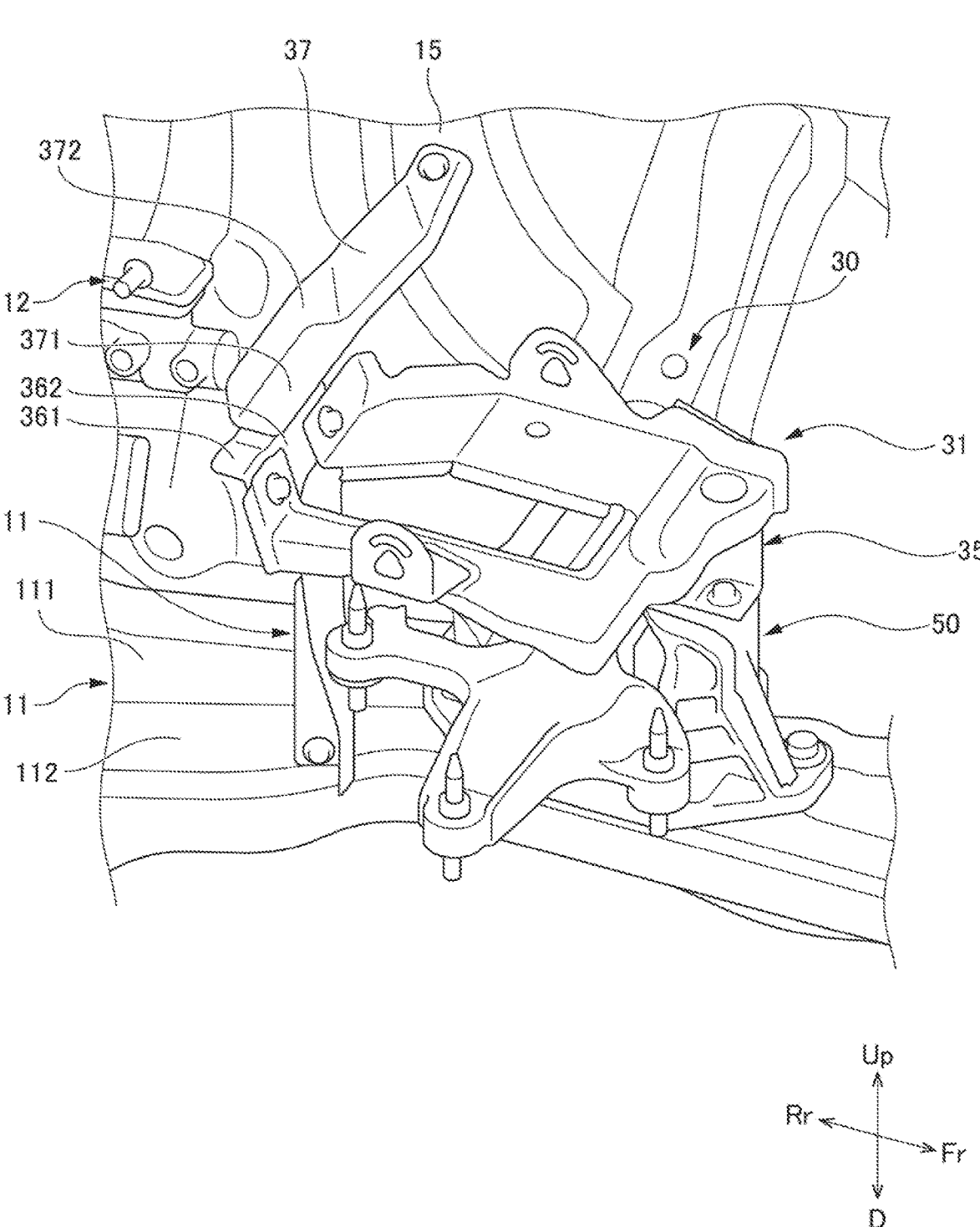
FIG. 5 is an enlarged perspective view that illustrates the periphery of the front side frame in which the vehicle battery rotating structure according to the first embodiment of the present invention is disposed, as viewed from front and above.
Figure 6:
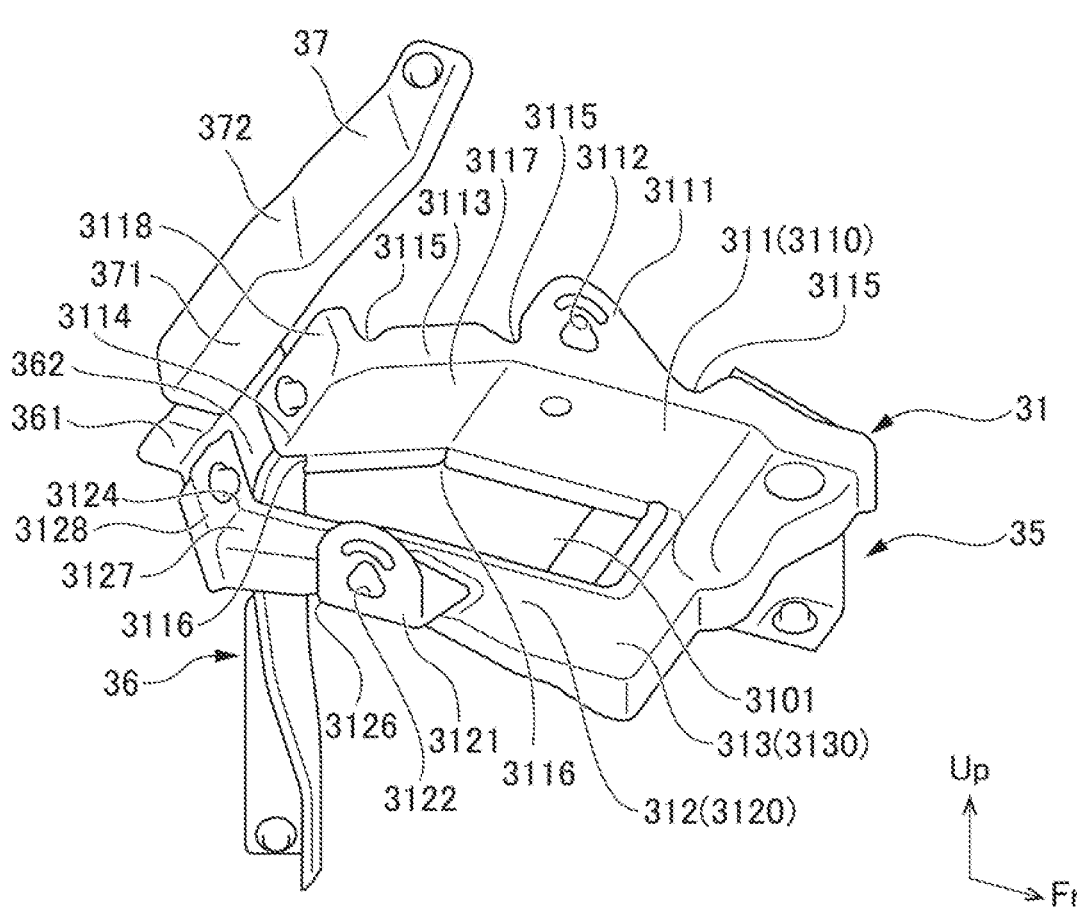
FIG. 6 is a perspective view that illustrates the vehicle battery rotating structure according to the first embodiment of the present invention, as viewed from front and above.
Figure 7:
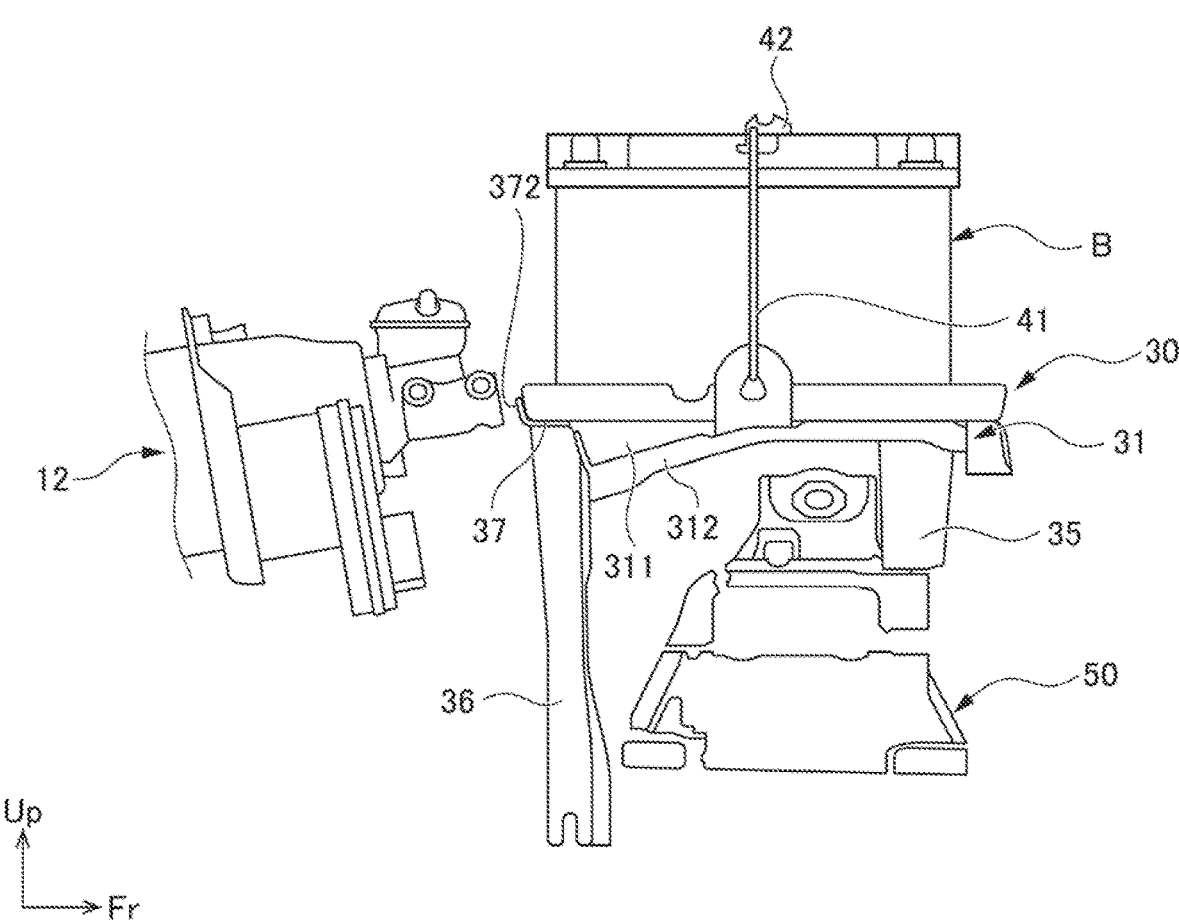
FIG. 7 is an enlarged side view that illustrates a state before a collision of a brake master cylinder device with the vehicle battery rotating structure according to the first embodiment of the present invention.
Figure 8:
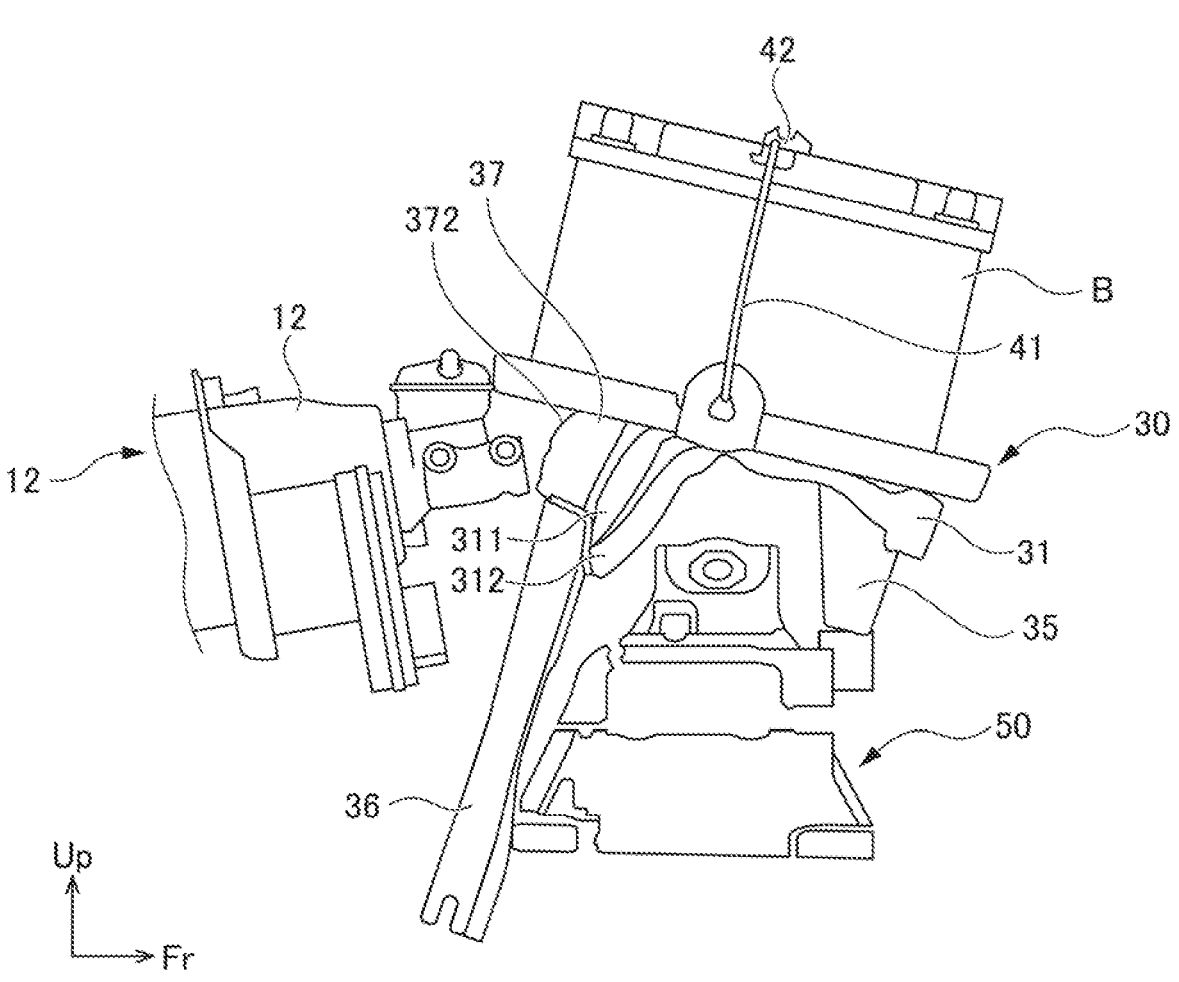
FIG. 8 is an enlarged side view that illustrates a state after the collision of the brake master cylinder device with the vehicle battery rotating structure according to the first embodiment of the present invention.

FIG. 5 is an enlarged perspective view that illustrates the periphery of the front side frame 11 in which the vehicle battery rotating structure 30 is mounted, as viewed from front and above. FIG. 6 is a perspective view that illustrates the vehicle battery rotating structure 30, as viewed from front and above. FIG. 7 is an enlarged side view that illustrates a state before a collision of a brake master cylinder device 12 with the vehicle battery rotating structure 30. FIG. 8 is an enlarged side view that illustrates a state after the collision of the brake master cylinder device 12 with the vehicle battery rotating structure 30. In each figure, an arrow denoted by Fr represents a vehicle body forward direction, an arrow denoted by Rr represents a vehicle body rearward direction, an arrow denoted by Up represents a vehicle body upward direction, an arrow denoted by L represents a left side in a vehicle width direction, and an arrow denoted by R represents a right side in the vehicle width direction. It should be noted that some components may not be illustrated in the figures for the sake of convenience.

As illustrated in FIG. 1, a front part of the vehicle body having an engine compartment includes a pair of left and right front side frames 11, and the like. It should be noted that in the figure, of the front side frames 11, only the left front side frame 11 is illustrated for convenience of explanation. The left and right front side frames 11 in the pair are respectively disposed on the left and right in the vehicle width direction so as to extend in the front-rear direction of the vehicle body; and have a mirror-symmetrical shape to each other. The left and right front side frames 11 in the pair are respectively connected to the left and right rear parts of an unillustrated bumper beam via an unillustrated bumper beam bracket which is arranged at a front end of each front side frame 11.

Behind the front side frames 11, an unillustrated dash panel is disposed so as to face forward and rearward and separates the engine compartment and a passenger compartment into front and rear sections. On a front side of the dash panel, the brake master cylinder device 12 is attached. The brake master cylinder device 12 has a base end that is fixed to a front face of the dash panel, and protrudes forwardly from the base end.

Next, the vehicle battery rotating structure 30 will be described in detail. The vehicle battery rotating structure 30 includes, as members each being separate and independent of the other: a battery B (see FIG. 4, etc.); a battery supporting plate 31 (see FIG. 1, etc.) having battery supporting faces 3110, 3120, and 3130 (see FIG. 6, etc.) and battery locking pieces 3111 and 3121; a pressure plate 42; and a mounting base 50 (see FIG. 1, etc.).

The mounting base 50 is fixed to an upper face 111 of one of the front side frames 11 with a bolt. As illustrated in, for example, FIGS. 1 and 2, the mounting base 50 has, an inverted-V shape in which the length in its front-rear direction becomes shorter as going upward from a base portion of the mounting base 50 which is fixed to the upper face 111 of the front side frame 11. In a part at about one-third of the way downwardly from a top end of the mounting base 50 in an up-down direction, a lower end of the reinforcement bracket 35 (see FIG. 2, etc.) that supports the battery supporting plate 31 is fixedly coupled with a bolt.

On a side face 112 of the front side frame 11, which is behind the mounting base 50 in the vehicle body, a rear supporting leg 36 is arranged. The rear supporting leg 36 extends upward obliquely so as to go toward an inside of the vehicle body (right side of the vehicle body) in the width direction of the vehicle body as going upward from the side face 112 of the front side frame 11. A lower end of the rear supporting leg 36 is fixedly coupled to the side face 112 of the front side frame 11 with a bolt. On an upper end face 361 of the rear supporting leg 36, a lower end of the upper battery supporting bracket 37 is fixed. In addition, in a front side of an upper end of the rear supporting leg 36, which is below the upper end face of the rear supporting leg 36, a supporting plate fixing face 362 (see FIG. 5, etc.) is formed where a rear end of the battery supporting plate 31 is fixedly coupled with a bolt.

The upper battery supporting bracket 37 is composed of a plate-shaped member in which a cross section orthogonal to a longitudinal direction of the upper battery supporting bracket 37 is of an approximate L shape, as illustrated in FIG. 5, etc. One face of the upper battery supporting bracket 37 (rear battery supporting face 371) having an approximate L-shaped cross section in the lower end of the upper battery supporting bracket 37 is fixedly coupled to the upper end face 361 of the rear supporting leg 36.

As illustrated in FIG. 3, the upper battery supporting bracket 37 extends from the lower end thereof which is fixed to the upper end face of the rear supporting leg 36, toward the left of the vehicle body as going toward the upper end of the upper battery supporting bracket 37; and bends toward the front of the vehicle body, above the upper face 111 of the front side frame 11. In a bent portion 376 which is the bent portion of the upper battery supporting bracket 37, the other face of the upper battery supporting bracket 37 having an approximate L-shaped cross section (upper end of the abutting face 372) is fixedly coupled, with a bolt, to a rigid member 15 that is fixed to the damper housing 14 to increase rigidity, at a position behind a rear end of the mounting base 50. Thus, the part of the upper battery supporting bracket 37, which forms the bent portion 376, is arranged between the brake master cylinder device 12 as an engine-mounted part and the mounting base 50.

The battery supporting plate 31 is formed in a plate shape having a U shape in a plan view, as illustrated in, for example, FIG. 3; and includes a left-side supporting plate portion 311, a right-side supporting plate portion 312, and a connecting plate portion 313 that connects them. Therefore, in the center of them, that is, in the center of the battery supporting faces 3110, 3120, and 3130 described later, an opening 3101 that is surrounded by them and penetrates the battery supporting plate 31 in an up-down direction is formed.

The upper faces of the left-side supporting plate portion 311, right-side supporting plate portion 312, and connecting plate portion 313 form the battery supporting faces 3110, 3120, and 3130 that have the battery B mounted thereon to support the battery B. In rear of the battery B supported by the battery supporting faces 3110, 3120, and 3130, the brake master cylinder device 12 is disposed; and the battery B and the abutting face 372 of the upper battery supporting bracket 37 face the brake master cylinder device 12.

As illustrated in FIG. 6, a left edge in a central part in a front-rear direction that is the longitudinal direction of the left-side supporting plate portion 311 has a battery locking piece 3111 that extends upward in a triangle shape. In front and rear of the battery locking piece 3111, a left edge plate portion 3113 extends in a front-rear direction from the battery locking piece 3111. The left edge plate portion 3113 has a plurality of notches 3115 formed thereon in front and rear of the battery locking piece 3111. In addition, an edge on the right side of the left-side supporting plate portion 311 also have a plurality of notches 3116 formed thereon. The rearmost notches 3115 and 3116 are formed at the positions of both ends in the lateral direction of a groove 3114 described later.

The battery locking piece 3111 has a locking hole 3112 formed thereon and the locking hole 3112 has a lower part of the locking rod 43 (see FIG. 4) locked therein. An upper part of the locking rod 43 is connected to a left end of the pressure plate 42 that presses the battery B from above.

As illustrated in FIG. 6, a rear end of the left-side supporting plate portion 311 has an inclined portion 3117 and a vertical wall portion 3118. The inclined portion 3117 is inclined so as to be lowered as it goes rearward. Thus, the left-side supporting plate portion 311 is bent in an inverted V-shape as illustrated in FIG. 6, etc. A lower end of the vertical wall portion 3118 is integrally connected to a lower end of the inclined portion 3117; and a connecting part between the vertical wall portion 3118 and the inclined portion 3117 forms the groove 3114 having an approximate L-shaped cross section. The vertical wall portion 3118 is fixedly coupled to the supporting plate fixing face 362 with a bolt.

As illustrated in FIG. 6, a right edge in a central part in a front-rear direction that is the longitudinal direction of the right-side supporting plate portion 312 has fixed thereto a battery locking piece 3121 that is composed of a part different from that of the right-side supporting plate portion 312 and extends upward in a triangle shape. The battery locking piece 3121 has a locking hole 3122 formed thereon and the locking hole 3122 has a lower, part of the locking rod 41 (see FIG. 4) locked therein. An upper part of the locking rod 41 is connected to a right end of the pressure plate 42 that presses the battery B from above. A part of the right-side supporting plate portion 312, where the battery locking piece 3121 is fixed, has a notch 3126 formed thereon that is recessed toward the left-side supporting plate portion 311.

A rear end of the right-side supporting plate portion 312 has an inclined portion 3127 and a vertical wall portion 3128. The inclined portion 3127 is inclined so as to be lowered as it goes rearward. Thus, the right-side supporting plate portion 312 is bent a little, as compared to the left-side supporting plate portion 311, in an inverted V-shape as illustrated in FIG. 6, etc. A lower end of the vertical wall portion 3128 is integrally connected to a lower end of the inclined portion 3127; and a connecting part between the vertical wall portion 3128 and the inclined portion 3127 forms the groove 3124 having an approximate L-shaped cross section. The vertical wall portion 3128 is fixedly coupled to the supporting plate fixing face 362 with a bolt, as illustrated in FIG. 6.

Next, operation in the vehicle battery rotating structure at the time of a head-on collision of the vehicle will be described. FIG. 7 is an enlarged side view that illustrates a state before a collision of the brake master cylinder device 12 with the vehicle battery rotating structure 30. FIG. 8 is an enlarged side view that illustrates a state after the collision of the brake master cylinder device 12 with the vehicle battery rotating structure 30. As illustrated in FIG. 7, at the time before a head-on collision of the vehicle, the brake master cylinder device 12 is arranged behind the abutting face 372 of the upper battery supporting bracket 37 in the vehicle battery rotating structure 30, so as to be separated from the abutting face 372.

When a head-on collision of the vehicle occurs, the front side frame 11 moves rearward. In this situation, since the reinforcement bracket 35 that supports a front part, of the battery supporting plate 31 is fixed to the mounting base 50 that is fixed to the front side frame 11, the battery B supported by the battery supporting plate 31 relatively moves, together with the front part of the battery supporting plate 31, rearward with respect to the brake master cylinder device 12.

With this, the left-side supporting plate portion 311 and right-side supporting plate portion 312 of the battery supporting plate 31 that are bent in an inverted-V shape in a side view are deformed to have a sharper inverted-V shape. This causes a displacement of the battery B so that a rear-half part of the battery B is lifted upward relative to the front end of the battery B.

When the abutting face 372 collides with the brake master cylinder device 12, the left-side supporting plate portion 311 and right-side supporting plate portion 312 of the battery supporting plate 31 that have an inverted-V shape in a side view are further deformed to have an even sharper inverted-V shape as illustrated in FIG. 8. As a result, a front end of the battery B supported by the battery supporting plate 31 turns downward and a rear end of it turns upward, so that the battery B rotates clockwise as viewed from the right side around the pressure plate 42 as a rotation axis, as illustrated in FIG. 8.

This embodiment provides the following effects. In this embodiment, the vehicle battery rotating structure 30 includes: a battery B that faces a brake master cylinder device 12 as an engine mounted part; a battery supporting plate 31 that has a battery supporting face that is deformable into an inverted-V shape at the time of a head-on collision; a pair of battery locking pieces 3111 and 3121 each of which is arranged on either side of the center in the front-rear direction of the battery supporting face; a pair of locking rods 43 and 41 that is locked in locking holes 3112 and 3122 of the pair of battery locking pieces 3111 and 3121; a pressure plate 42 that is connected to upper parts of the pair of locking rods 43 and 41.

This makes it possible that the brake master cylinder device 12 moves rearward at the time of a head-on collision so as to make the battery B pressed rearward. At this time, the front part of the battery supporting plate 31 having the battery supporting face lifts the battery B. This causes lower parts of battery fixing hooks on lower parts of the locking rods 41 and 43 to deform the battery locking pieces 3111 and 3121. Furthermore, the battery B rotates around the pressure plate 42 as a rotation axis which is on upper parts of the locking rods 41 and 43. Therefore, the brake master cylinder device 12 prevents the battery B from moving rearward where there is a passenger compartment so as to be able to protect ankles and the like of passengers.

In addition, in this embodiment, grooves 3114 and 3124 are arranged in a rear part of the battery supporting face of the battery supporting plate 31 that supports the battery B. This allows bending at the groove 3114 and the groove 3124 on the battery supporting plate 31, which makes it possible to perform deformation into a sharper inverted-V shape; and thus, the battery B can be easily rotated.

Furthermore, in this embodiment, a bent portion 376 fixed to a rigid member 15 on a side part of the vehicle body is arranged on an upper battery supporting bracket 37 behind the grooves 3114 and 3124; and the groove 3114, the groove 3124, and the bent portion 376 are arranged between the brake master cylinder device 12 and a mounting base 50 that supports the battery supporting plate 31. This allows the groove 3114, the groove 3124, and the bent portion 376 to be deformed by the mounting base 50 having rigidity and the brake master cylinder device 12 that is an engine-mounted part; and thus, the battery B can be easily rotated.

Furthermore, in this embodiment, an upper face of the battery supporting plate 31 as a battery supporting face has an opening 3101. This facilitates fastening of the mounting base 50 below the battery supporting plate 31 having the battery supporting face to an engine or transmission, resulting in an improvement in workability.

Furthermore, in this embodiment, the upper battery supporting bracket 37 includes: an abutting face 372 that is formed to have an approximate L-shaped cross section and faces the brake master cylinder device 12; and a rear battery supporting face 371. This allows the abutting face 372 to securely abut on the brake master cylinder device 12 at the time of a head-on collision and also allows the battery B to be supported by the rear battery supporting face 371.

Furthermore, in this embodiment, the groove 3114 has a plurality of notches 3115 and 3116 arranged thereon. This makes it possible to significantly deform a left-side supporting plate portion 311 and a right-side supporting plate portion 312, starting from the notches 3115 and 3116, and also to significantly deform the groove 3114.

Furthermore, in this embodiment, a rear supporting leg 36 that is coupled to a front side frame 11 is coupled to the upper battery supporting bracket 37. This allows the battery B to be supported in the vehicle-width direction by the upper battery supporting bracket 37 and to be supported in an up-down direction by the rear supporting leg 36; and thus, the battery can be stably supported.

Furthermore, in this embodiment, the groove 3114 is formed by an inclined portion 3117 and a vertical wall portion 3118; and the groove 3124 is formed by an inclined portion 3127 and a vertical wall portion 3128. Thus, each of the grooves 3114 and 1324 has an approximate L-shaped cross section and therefore, allows the battery supporting plate 31 to be easily deformed in the grooves 3114 and 1324.

Furthermore, in this embodiment, vertical wall portions 3118 and 3128 are coupled to a supporting plate fixing face 362 that is a front face of the rear supporting leg 36. This allows the left-side supporting plate portion 311 having one battery supporting face and the right-side supporting plate portion 312 having the other battery supporting face to be supported by the vertical wall portions 3118 and 3128.

Furthermore, in this embodiment, a reinforcement bracket 35 that reinforces the left-side supporting plate portion 311 is coupled to the mounting base 50 that supports the battery supporting plate 31 having the battery supporting face. This makes it possible to move, at the time of a head-on collision a front part of the left-side supporting plate portion 311 rearward by the reinforcement bracket 35 that follows the mounting base 50.

Next, a second embodiment of the present invention will be described. A vehicle battery rotating structure 30A according to the second embodiment is different from the vehicle battery rotating structure 30 according to the first embodiment in that: it includes a front supporting leg 60A; and the battery supporting plate included therein is composed of two independent plate-shaped members of: a left-side supporting plate 311A having the same configuration as the left-side supporting plate portion 311 in the first embodiment; and a right-side supporting plate 312A having the same configuration as the right-side supporting plate portion 312 in the first embodiment.

Figure 9:
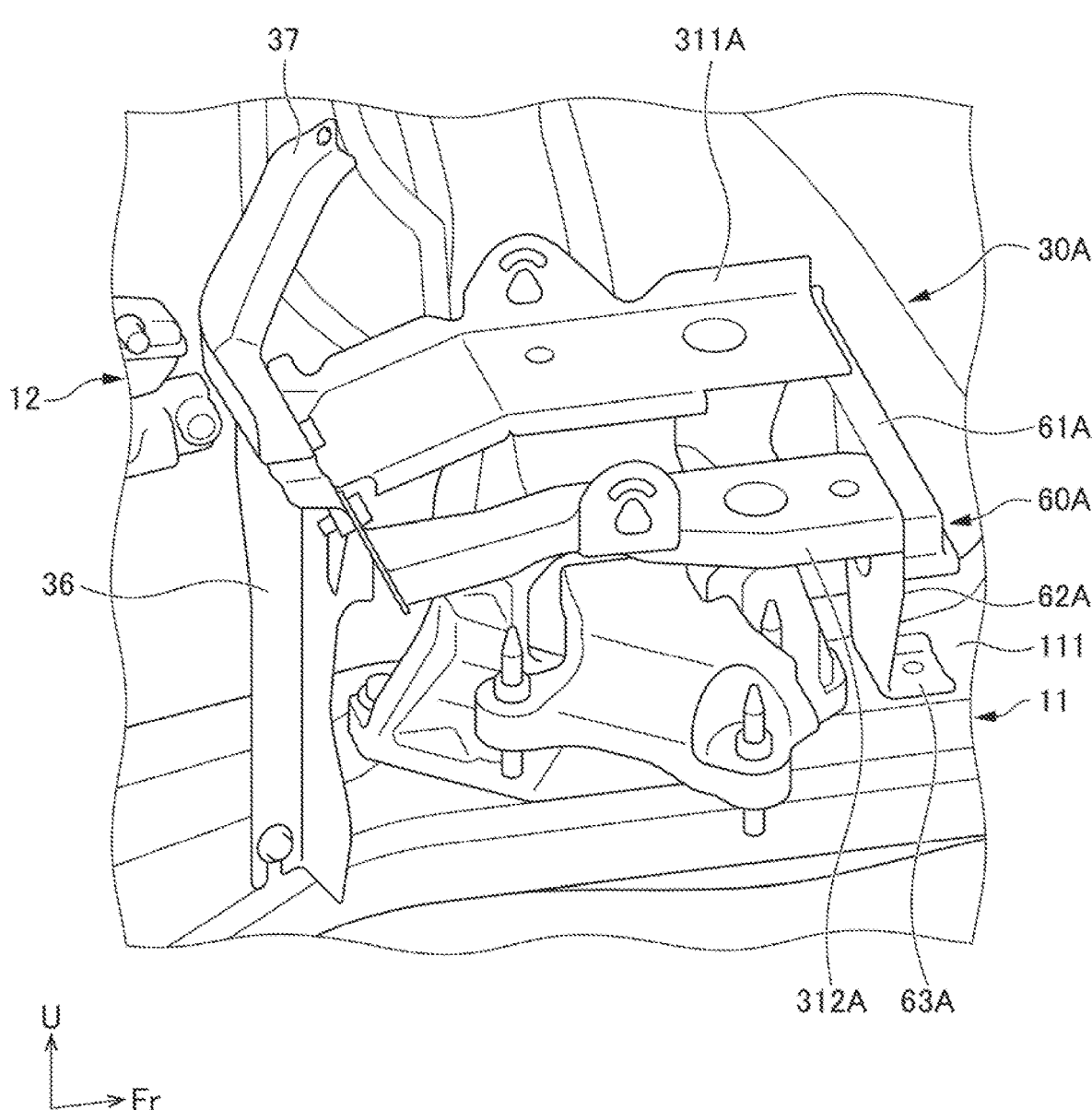
FIG. 9 is an enlarged perspective view that illustrates a periphery of a front side frame in which a vehicle battery rotating structure according to a second embodiment of the present invention is disposed, as viewed from behind and above.
Figure 10:
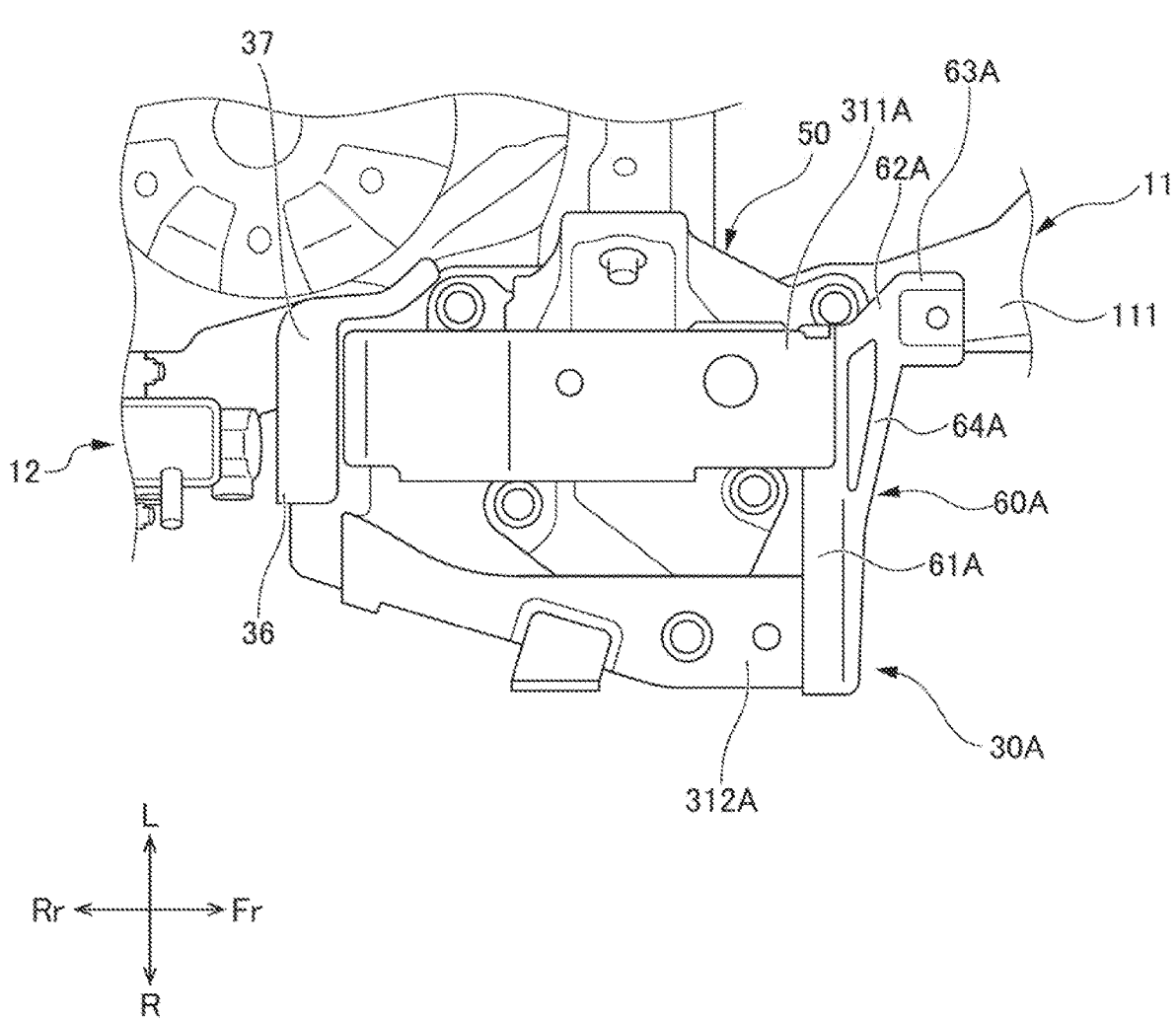
FIG. 10 is an enlarged plan view that illustrates the periphery of the front side frame in which the vehicle battery rotating structure according to the second embodiment of the present invention is disposed.

That is, a battery supporting face that supports a battery is divided into an upper face of the left-side supporting plate 311A which forms one battery supporting face, and an upper face of the right-side supporting plate 312A which forms the other battery supporting face. Components other than described above are the same as those in the vehicle battery rotating structure 30 according to the first embodiment, and the same components are denoted by the same reference signs to omit descriptions thereof. FIG. 9 is an enlarged perspective view that illustrates a periphery of a front side frame 11 in which a vehicle battery rotating structure 30A is disposed, as viewed from behind and above. FIG. 10 is an enlarged plan view that illustrates the periphery of the front side frame 11 in which the vehicle battery rotating structure 30A is disposed.

The front supporting leg 60A has a connecting upper plate portion 61A, a supporting wall portion 62A, a fixed portion 63A, and an inclined plate portion 64A. On an upper face of the connecting upper plate portion 62A, a lower face of a front end of the left-side supporting plate 311A is fixedly coupled. On a lower face of the connecting upper plate portion 61A, an upper face of a front end of the right-side supporting plate 312A is fixedly coupled. That is, a lower face of the left-side supporting plate 311A and an upper face of the right-side supporting plate 312A that form the battery supporting face are coupled to the connecting upper plate portion 61A of the front supporting leg 60A, so as to be vertically asymmetrical to each other.

The supporting wall portion 62A and the inclined plate portion 64A extend downward from the connecting upper plate portion 61A and are integrally connected to the fixed portion 63A. More specifically, the supporting wall portion 62A extends approximately vertically downward from a left-side end of the connecting upper plate portion 61A; and the inclined plate portion 64A inclinedly extends toward the front side frame 11 from a right-side end of the connecting upper plate portion 61A. In this configuration, the connecting upper plate portion 61A of the front supporting leg 60A is inclined toward the upper face of the right-side supporting plate 312A from a part where the left-side supporting plate 311A is fixed. The fixed portion 63A is fixedly coupled to an upper face 111 of the front side frame 11.

Figure 11:
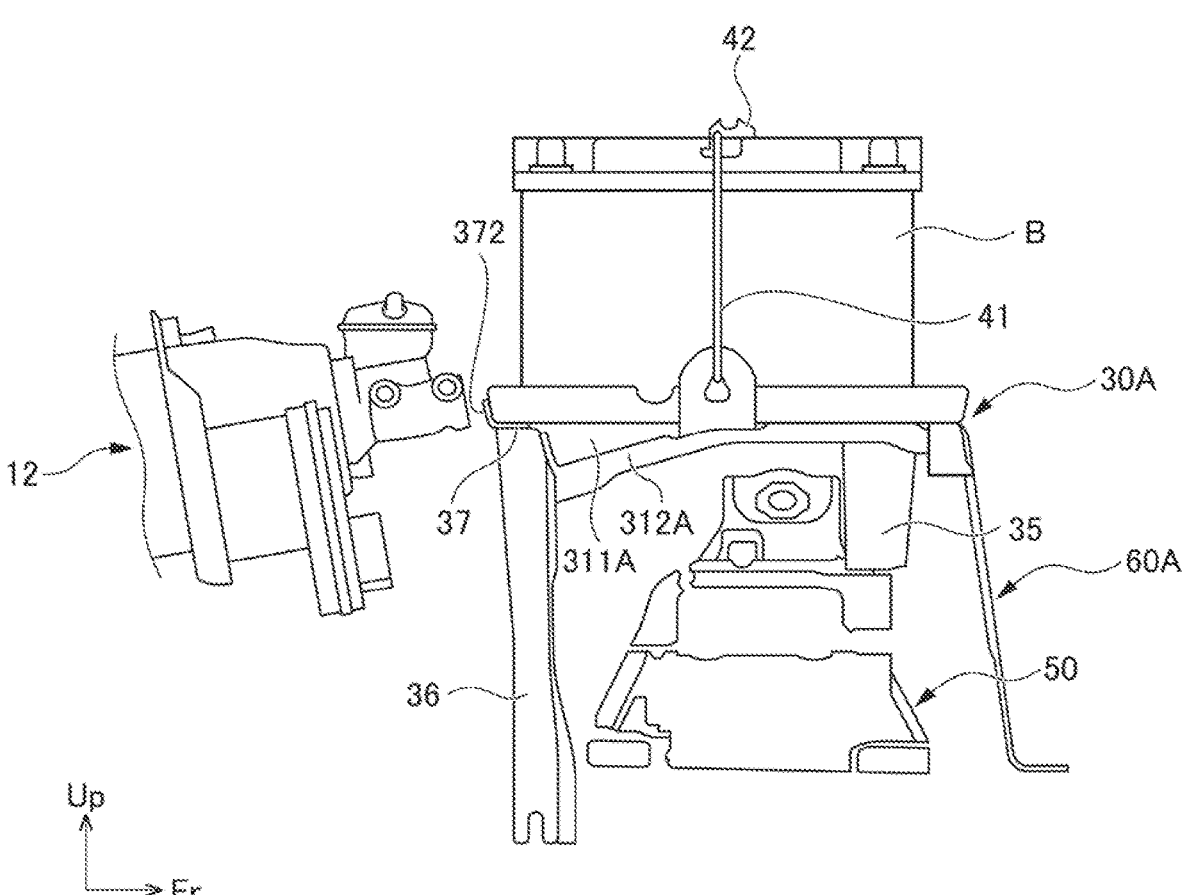
FIG. 11 is an enlarged side view that illustrates a state before a collision of a brake master cylinder device with the vehicle battery rotating structure according to the second embodiment of the present invention.
Figure 12:
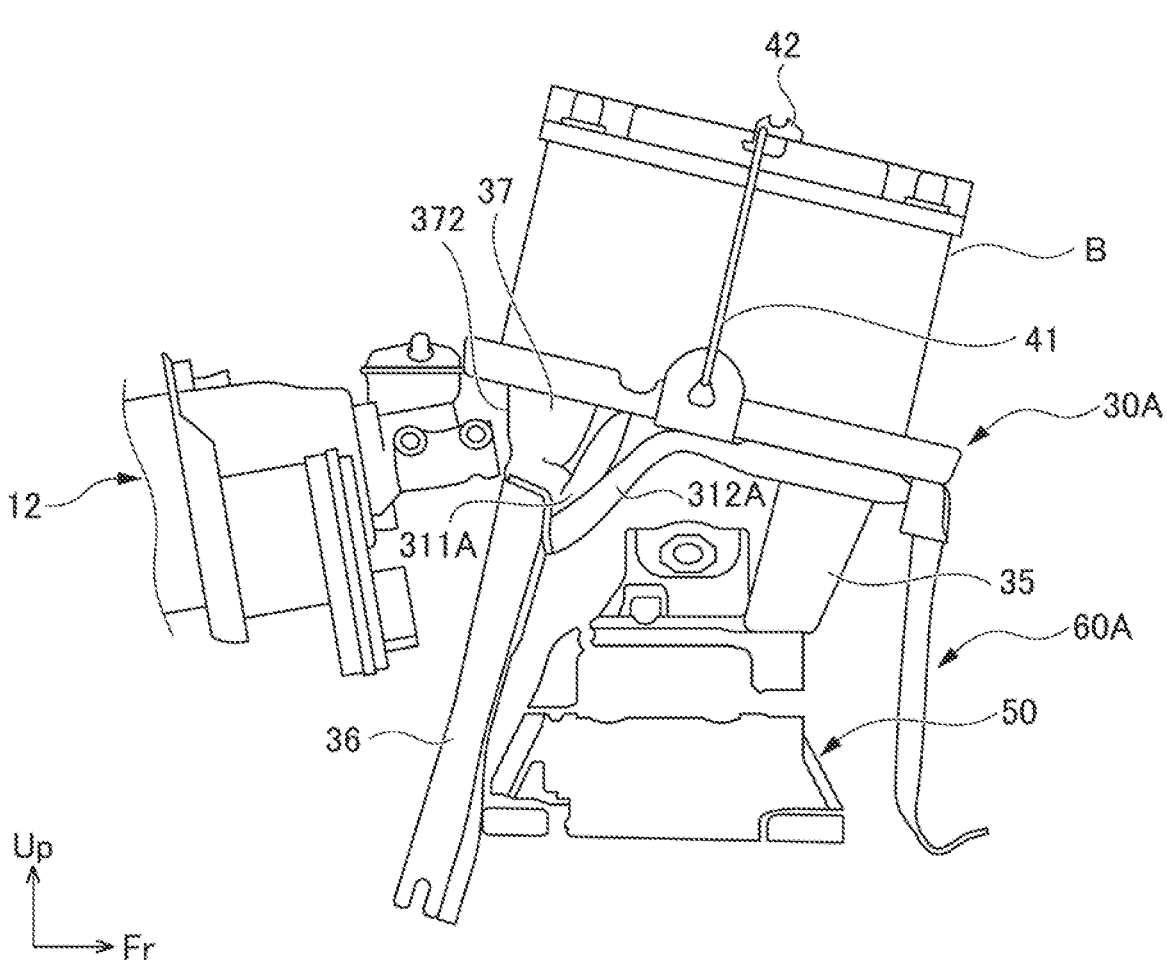
FIG. 12 is an enlarged side view that illustrates a state after the collision of the brake master cylinder device with the vehicle battery rotating structure according to the second embodiment of the present invention.

Next, the operation in the vehicle battery rotating structure at the time of a head-on collision of the vehicle will be described. FIG. 11 is an enlarged side view that illustrates a state before a collision of the brake master cylinder device 12 with the vehicle battery rotating structure 30A. FIG. 12 is an enlarged side view that illustrates a state after the collision of the brake master cylinder device 12 with the vehicle battery rotating structure 30A.

As illustrated in FIG. 11, at the time before a head-on collision of the vehicle, the brake master cylinder device 12 is arranged behind an abutting face 372 of an upper battery supporting bracket 37 in the vehicle battery rotating structure 30A, so as to be separated from the abutting face 372, as with the first embodiment.

When a head-on collision of the vehicle occurs, the front side frame 11 moves rearward. Accordingly, a battery E supported by the left-side supporting plate 311A relatively greatly moves rearward with respect to the brake master cylinder device 12, together with a front part of the left-side supporting plate 311A since a reinforcement bracket 35 that supports the front part of the left-side supporting plate 311A is fixed to a mounting base 50 that is fixed to the front side frame 11 and further since the front supporting leg 60A that supports the front end of the left-side supporting plate 311A is fixed to the front side frame 11.

When the abutting face 372 collides with the brake master cylinder device 12, the front ends of the left-side supporting plate 311A and right-side supporting plate 312A which have an inverted-V shape in a side view are pulled downward by the front supporting leg 60A and deformed to have an even sharper inverted-V shape as illustrated in FIG. 12. As a result, a front end of the battery B supported by the left-side supporting plate 311A and the right-side supporting plate 312A greatly turns downward and a rear end of it turns upward, so that the battery B greatly rotates clockwise as viewed from the right side around a pressure plate 42 as a rotation axis, as illustrated in FIG. 12.

This embodiment provides the following effects. In this embodiment, a battery supporting plate is formed to be divided into a left-side supporting plate 311A and a right-side supporting plate 312A, and the upper faces of them that form a battery supporting face are also divided. This allows the left-side supporting plate 311A having one battery supporting face to be fixed to the mounting base 50, the right-side supporting plate 312A having the other battery supporting face to be deformed into an inverted-v shape, and the battery supporting plate having the battery supporting faces to be light in weight.

Furthermore, in this embodiment, the left-side supporting plate 311A having the one battery supporting face and the right-side supporting plate 312A having the other battery supporting face are coupled to the front supporting leg 60A in front of them, so as to be vertically asymmetrical to each other. This allows the left-side supporting plate 311A to be pulled downward by the mounting base 50 and the right-side supporting plate 312A to be pulled upward while being deformed in to an inverted-V shape, which can prevent separation between the battery 3 and the front supporting leg 60A.

Furthermore, in this embodiment, the front supporting leg 60A is inclined toward the right-side supporting plate 312A. This allows the right-side supporting plate 312A to be easily deformed into an inverted-V shape due to moment effects.

The present invention is not limited to the embodiments described above, but modifications or improvements are also included in the scope of the present invention as long as the object of the present invention can be achieved. For example, in this embodiment, the engine-mounted part is the brake master cylinder device 12 and the mounting base is the mounting member 50, but are not limited thereto.

EXPLANATION OF REFERENCE NUMERALS

12: Brake master cylinder device (Engine-mounted part)
15: Rigid member
30: Vehicle battery rotating structure
31: Battery supporting plate
35: Reinforcement bracket
36: Rear supporting leg
37: Upper battery supporting bracket
41, 43: Locking rod
42: pressure plate
50: Mounting member (Mounting base)
60A Front supporting leg
311A: Left-side supporting plate
312A: Right-side supporting plate
362: Supporting plate fixing face
371: Rear battery supporting face
372: Abutting face
376: Bent portion
3101: Opening
3111, 3121: Battery locking piece
3112, 3122: Locking hole
3114, 3124: Groove
3115, 3336, 3126: Notch
3117, 3127: Inclined portion
3118, 3128: Vertical wall portion
B Battery

What is claimed is:

1. A vehicle battery rotating structure comprising:
a battery on an upper battery supporting bracket, the battery facing an engine-mounted part, and the upper battery supporting bracket being configured to collide with the engine-mounted part in a vehicle body rearward direction at a time of a head-on collision;
a battery supporting plate that supports the battery and has a front end and a rear end, the front end being coupled to a front side frame, the battery supporting plate being bent in an inverted-V shape and deformable into a sharper inverted-V shape at the time of the head-on collision, the front end and the rear end of the battery supporting plate being configured to turn downward and upward, respectively, at the time of the head-on collision;
a pair of battery locking pieces each of which is arranged on either side of a center in a front-rear direction of the battery supporting plate;
a pair of locking rods that is locked into locking holes of the pair of battery locking pieces; and
a pressure plate that is connected to upper parts of the pair of locking rods, wherein
at the time of the head-on collision, the battery supporting plate is configured to be deformed into the sharper inverted-V shape and the upper battery supporting bracket collides with the engine-mounted part in the vehicle body rearward direction so that the engine-mounted part lifts the rear end of the battery supporting plate upward, whereby the vehicle battery rotating structure rotates the battery around the pressure plate as a rotation axis such that a rear end of the battery turns upward and a front end of the battery turns downward.

2. The vehicle battery rotating structure according to claim 1, wherein
a groove is formed in a rear part of the battery supporting plate that supports the battery.

3. The vehicle battery rotating structure according to claim 2, wherein
the upper battery supporting bracket is provided behind the groove, the upper battery supporting bracket having a bent portion fixed to a rigid member on a side part of a vehicle body; and
the groove and the bent portion are arranged between the engine-mounted part and a mounting base that supports the battery supporting plate.

4. The vehicle battery rotating structure according to claim 1, wherein
the battery supporting plate has an opening.

5. The vehicle battery rotating structure according to claim 1, wherein
the battery supporting plate is divided into one battery supporting plate and an other battery supporting plate.

6. The vehicle battery rotating structure according to claim 3, wherein
the upper battery supporting bracket includes an abutting face and a rear battery supporting face, the abutting face being formed to have an approximate L-shaped cross section and facing the engine-mounted part.

7. The vehicle battery rotating structure according to claim 2, wherein
the groove has a plurality of notches formed thereon.

8. The vehicle battery rotating structure according to claim 3, wherein
the upper battery supporting bracket has a rear supporting leg coupled thereto, the rear supporting leg being coupled to the front side frame.

9. The vehicle battery rotating structure according to claim 2, wherein
the groove is formed by an inclined part and a vertical wall part so as to have an approximate L-shaped cross section.

10. The vehicle battery rotating structure according to claim 8, wherein
the groove is formed by an inclined part and a vertical wall part so as to have an approximate L-shaped cross section; and
the vertical wall part is coupled to a front face of the rear supporting leg.

11. The vehicle battery rotating structure according to claim 5, wherein
a mounting base that supports the battery supporting plate has a reinforcement bracket coupled thereto, the reinforcement bracket reinforcing the one battery supporting plate.

12. The vehicle battery rotating structure according to claim 5, wherein
the one battery supporting plate and the other battery supporting plate are coupled to a front supporting leg in front so as to be vertically asymmetrical to each other.

13. The vehicle battery rotating structure according to claim 12, wherein
the front supporting leg is inclined toward the other battery supporting plate.

* * * * *